United States Patent Office 3,216,988
Patented Nov. 9, 1965

3,216,988
THREE-COMPONENT METAL HYDRIDE-TRANSITION METAL HALIDE-ANTIMONY COMPOUND CATALYST FOR POLYMERIZING OLEFINS
Harry W. Coover, Jr., Kingsport, Tenn., and Newton H. Shearer, Jr., Zurich, Switzerland, assignors to Eastman Kodak Company, Rochester, N.Y., a corporation of New Jersey
No Drawing. Filed Sept. 26, 1962, Ser. No. 226,441
The portion of the term of the patent subsequent to Oct. 16, 1979, has been disclaimed and dedicated to the Public
13 Claims. (Cl. 260—93.7)

This application is a continuation-in-part of our copending application, Serial No. 724,913, filed March 31, 1958, now Patent No. 3,058,969.

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins having a high density using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

Some of the catalysts that are effective for producing crystalline high density polyethylene cannot be used to produce a similar type of polypropylene. For example, catalyst combinations of metal hydrides with transition element compounds have been suggested for ethylene polymerization, but these catalysts are relatively ineffective for polymerizing propylene to form high density crystalline polymers. Thus, one cannot predict whether a specific catalyst combination will be effective to produce crystalline high density polymers with specific α-olefins.

This invention is concerned with and has for an object the provision of improved processes whereby α-monoolefins and particularly propylene can be readily polymerized by catalytic means to give high molecular weight, highly crystalline polymers. A particular object of the invention is to provide an improved catalyst combination which has unexpected catalytic activity for the polymerization of α-monoolefins to form crystalline high density polymers. Other objects will be apparent from the description and claims which follow.

The above and other objects are attained by means of this invention, wherein α-monoolefins, either singly or in admixture, are readily polymerized to high molecular weight solid polymers by effecting the polymerization in the presence of a catalytic mixture containing a hydride of a Group IA or Group IIA metal, a halide of a transition metal selected from the group consisting of titanium, zirconium, vanadium, chromium and molybdenum, the halogen atoms being chlorine, bromine or iodine, and an antimony compound having the formula $R_3Sb$ wherein each R is selected from the group consisting of hydrogen and hydrocarbon radicals containing 1 to 12 carbon atoms and selected from the group consisting of alkyl, aryl and aralkyl. Among these hydrocarbon radicals are methyl, ethyl, propyl, butyl, octyl, dodecyl, phenyl, phenylethyl and naphthyl. In the antimony compound the three radicals represented by R can be the same or different. The inventive process can be carried out in liquid phase in an inert organic liquid and preferably an inert liquid hydrocarbon vehicle. The process proceeds with excellent results over a temperature range of from 0° C. to 250° C., although it is preferred to operate within the range of from about 50° C. to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert reaction medium.

The invention is of particular importance in the preparation of highly crystalline polypropylene, the polybutenes and polystyrene although it can be used for polymerizing ethylene, mixtures of ethylene and propylene as well as other α-monoolefins containing up to 10 carbon atoms. The polyethylene which is obtained in accordance with this invention has a softening or fusion point greater than 120° C. whereby the products prepared therefrom can be readily employed in contact with boiling water without deformation or other deleterious effects. The process of the invention readily results in solid polymers having molecular weights greater than 1000 and usually greater than 10,000. Furthermore, polymers having molecular weights of as much as 1,000,000 or higher can be readily prepared if desired. The high molecular weight, high density polyethylenes of this invention are insoluble in solvents at ordinary temperatures but they are soluble in such solvents as xylene, toluene or tetralin at temperatures above 100° C. These solubility characteristics make it possible to carry out the polymerization process under conditions wherein the polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosity as measured in tetralin at 145° C. can be varied from about 0.5 or lower to 5.0 or higher. Melt indices as measured by the standard ASTM method may be varied from about 0.1 to 100 or even higher.

The novel catalysts described above are quite useful for polymerizing propylene to form a crystalline, high-density polymer. The polypropylene produced has a softening point above 155° C. and a density of 0.91 and higher. Usually, the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

As has been indicated above the improved results obtained in accordance with this invention depend upon the particular catalyst combination. Thus, one of the components of the catalyst is a hydride of a metal from Groups IA and IIA. Specifically, hydrides of lithium, sodium, potassium, magnesium, calcium and barium can be used as well as hydrides containing the above metals and another metal such as aluminum. For example, sodium aluminum hydride, lithium aluminum hydride, and the like can be used in the catalyst compositions. Another component of the catalyst composition is a halide of a transition metal selected from the group consisting of titanium, zirconium, vanadium, chromium and molybdenum. In these halides the transition metal can be at its maximum valence but it is possible to employ a compound of a transition metal having a reduced valence. Also, the halogen is selected from the group consisting of chlorine, bromine and iodine. Such compounds as titanium tetrachloride, titanium trichloride, titanium dichloride, titanium tetrabromide, titanium tetraiodide, titanium tribromide and titanium triiodide can be used in the catalyst combination. Similar halides of zirconium, vanadium, chromium and molybdenum can also be used. For the most desirable results it is preferred to use a halide of titanium having either its maximum valency or a reduced valency and specifically it is preferred to employ either titanium tetrachloride or titanium trichloride in the catalyst composition. The third component of the catalyst composition is a compound of antimony having the structural formula $R_3Sb$ wherein each R is a radical selected from the group consisting of hydrogen and hydrocarbon radicals containing 1 to 12 carbon atoms and selected from the group consisting of alkyl, aryl and aralkyl. In this third component the R radicals can be the same but in some instances it is desired to employ different radicals within the definition set forth above. Among the specific compounds that can be used are triethyl stibine, tri n-butyl stibine, trihexylstibine, tridodecyl stibine, triphenyl stibine and the like. The catalyst compositions of this invention, when reacted with water, do not produce hydrogen.

The limiting factor in the temperature of the process apepars to be the decomposition temperature of the catalyst. Ordinarily, temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixtures. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example up to 40% and higher are preferred. Higher concentrations of monomer ordinarily increase the rate of polymerization, but concentrations about 5–10% by weight in a solution process are ordinarily less desirable because the polymer dissolved in the reaction medium results in a very viscous solution.

The molar ratio of the hydride to transition metal halide can be varied within the range of 1:0.5 to 1:2, and the molar ratio of hydride to antimony compound can be varied within the range of 1:1 to 1:0.25, but it will be understood that higher and lower molar ratios are within the scope of this invention. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half hour to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well known inert liquid hydrocarbons. The diluents employed in practicing this invention can be advantageously purified prior to use in the polymerization reaction by contacting the diluent, for example in a distillation procedure or otherwise, with the polymerization catalyst to remove undesirable trace impurities. Also, prior to such purification of the diluent the catalyst can be contacted advantageously with polymerizable α-monoolefin.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

A particularly effective catalyst that can be used in accordance with this invention contains lithium aluminum hydride, titanium tetrachloride and triphenylstibine. The importance of the various components of this reaction mixture is evident from the fact that a mixture of lithium aluminum hydride and titanium tetrachloride is relatively ineffective for polymerizing propylene to crystalline polymer. However, when triphenyl stibine or other antimony compound within the scope of this invention is added to the mixture the resulting catalyst composition is highly effective for polymerizing propylene to form a highly crystalline high density polymer.

Thus, by means of this invention polyolefins such as polyethylene and polypropylene are readily produced using a catalyst combination which, based on the knowledge of the art, would not be expected to be effective. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures is employed. As a result of the use of this novel catalyst it is possible to produce polymeric hydrocarbons, particularly polypropylene, having properties not heretofore obtainable. For example, polypropylene prepared in the presence of catalyst combination within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example by washing with water or lower aliphatic alcohols such as methanol.

The catalyst compositions have been described above as being effective primarily for the polymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The following examples are illustrative of this invention.

*Example 1*

This example illustrates the relatively large quantity of rubbery polymer obtained with a two-component catalyst comprising a mixture of an alkali metal hydride and a compound of a transition element. In a nitrogen-filled dry box, a clean, dry, stainless-steel autoclave was charged with 100 ml. dry n-heptane, 0.11 g. sodium hydride and 0.89 g. titanium tetrachloride. The autoclave was sealed and removed from the dry box. From a blowcase, 100 ml. of liquid propylene was charged into the autoclave, which was then attached to a rocking mechanism and heated to 85° C. After six hours of rocking at 85° C., the autoclave was cooled to room temperature and vented. The contents of the autoclave were washed several times with dry methanol and then with water. The polymer was dried overnight in an oven at 50° C. The weight of polymer was 28.7 g. and its inherent viscosity was 1.78. A ten-gram sample of this product was extracted with n-butyl ether at 70° C. A residue of 10.4 g. of crystalline polymer was obtained which had an inherent viscosity of 2.31 and a density of 0.918.

When $TiCl_3$ was used instead of $TiCl_4$, in a similar run the crystallinity of the product was slightly improved but the yield was somewhat lower. Thus, a yield of 21.2 g. of polymer was found to contain 11.5 g. of crystalline material insoluble in n-butyl ether.

*Example 2*

The procedure of Example 1 was followed using 0.11 g. NaH, 0.89 g. $TiCl_4$ and 0.81 g. of $Sb(C_6H_5)_3$ as a catalyst. A yield of 36.3 g. of crystalline polypropylene was obtained with a density of 0.915 and an inherent viscosity of 2.18. When $TiCl_3$ was used instead of $TiCl_4$, the yield of crystalline polymer was 29.4 g. The density of this product was 0.918, and the inherent viscosity was 3.16.

*Example 3*

The procedure of Example 1 was followed, using as a catalyst a 1:1 molar ratio mixture of titanium tetrachloride and lithium aluminum hydride. A yield of 41.3 g. of polypropylene was obtained. The inherent viscosity of the product was 1.62 and its density was 0.896. Extraction of this product with n-butyl ether at 70° C. gave a residue of 19.0 g. of crystalline polypropylene which had an inherent viscosity of 2.24 and a density of 0.914. When $TiCl_3$ was used instead of $TiCl_4$, a yield of 38.7 g. of polypropylene was obtained. This product contained 20.4 g. of polymer which was insoluble in n-butyl ether.

*Example 4*

When the process of Example 3 was repeated using one gram of a catalyst containing lithium aluminum hydride, titanium tetrachloride and triethylstibine in a molar ratio of 1:1:0.6, the yield of crystalline polypropylene was 44.1 g. with a density of 0.918 and an inherent viscosity of 2.89. When $TiCl_3$ was used instead of $TiCl_4$, the yield was 43.7 g. of polypropylene which had a density of 0.921 and an inherent viscosity of 3.16.

*Example 5*

The procedure of Example 4 was followed, but the catalyst was composed of a 1:1:0.5 ratio of calcium hydride, titanium trichloride and tri-n-butylstibine. A yield of 45.6 g. of crystalline polypropylene was obtained. This product had a density of 0.920 and an inherent viscosity of 3.27.

Example 6

The procedure of Example 4 was followed, but the catalyst was composed of calcium hydride, vanadium trichloride and tribenzylstibine at a molar ratio of 1:1:0.4. Instead of using a solvent a total of 200 ml. of liquid propylene was charged into the autoclave. A yield of 83.2 g. of crystalline polypropylene was obtained. This product had a density of 0.918 and an inherent viscosity of 3.17. Similar results were obtained when 1-butene, 1-pentene, 3-methyl-1-butene or 4-methyl-1-pentene were used as monomers instead of propylene.

Although the invention has been described in considerable detail with reference to certain preferred embodiments thereof, variations and modifications can be effected within the spirit and scope of this invention as described hereinabove and as defined in the appended claims.

We claim:

1. In a polymerization of α-olefinic hydrocarbon containing 2 to 10 carbon atoms to form solid, crystalline polymer, the improvement which comprises catalyzing the polymerization with a catalytic mixture of an inorganic hydride of a metal selected from the group consisting of alkali metals and alkaline earth metals, a halide of a transition metal selected from the group consisting of titanium, zirconium, vanadium, chromium and molybdenum, the halogen atoms being selected from the group consisting of chlorine, bromine and iodine and an antimony compound having the formula $R_3Sb$ wherein each R is selected from the group consisting of hydrogen and hydrocarbon radicals containing 1 to 12 carbon atoms and selected from the group consisting of alkyl, aryl and aralkyl.

2. In the polymerization of propylene to form solid, crystalline polymer, the improvement which comprises effecting the polymerization in the presence of a catalytic mixture of an inorganic hydride of a metal selected from the group consisting of alkali metals and alkaline earth metals, a halide of a transition metal selected from the group consisting of titanium, zirconium, vanadium, chromium and molybdenum, the halogen atoms being selected from the group consisting of chlorine, bromine and iodine and an antimony compound having the formula $R_3Sb$ wherein each R is selected from the group consisting of hydrogen and hydrocarbon radicals containing 1 to 12 carbon atoms and selected from the group consisting of alkyl, aryl and aralkyl.

3. In the polymerization of propylene to form solid, crystalline polymer, the improvement which comprises effecting the polymerization in the presence of a catalytic mixture of lithium aluminum hydride, titanium tetrachloride and triphenyl stibine.

4. In the polymerization of propylene to form solid, crystalline polymer, the improvement which comprises effecting the polymerization in the presence of a catalytic mixture of lithium aluminum hydride, titanium trichloride and triphenyl stibine.

5. In the polymerization of propylene to form solid, crystalline polymer, the improvement which comprises effecting the polymerization in the presence of a catalytic mixture of sodium hydride, titanium trichloride and triphenyl stibine.

6. In the polymerization of propylene to form solid, crystalline polymer, the improvement which comprises effecting the polymerization in the presence of a catalytic mixture of calcium hydride, titanium trichloride and triethyl stibine.

7. In the polymerization of propylene to form solid, crystalline polymer, the improvement which comprises effecting the polymerization in the presence of a catalytic mixture of lithium aluminum hydride, titanium trichloride and tributyl stibine.

8. As a composition of matter, a polymerization catalyst containing an inorganic hydride of a metal selected from the group consisting of alkali metals and alkaline earth metals, a halide of a transition metal selected from the group consisting of titanium, zirconium, vanadium, chromium and molybdenum, the halogen atoms being selected from the group consisting of chlorine, bromine and iodine and an antimony compound having the formula $R_3Sb$ wherein each R is selected from the group consisting of hydrogen and hydrocarbon radicals containing 1 to 12 carbon atoms and selected from the group consisting of alkyl, aryl and aralkyl.

9. As a composition of matter, a polymerization catalyst containing lithium aluminum hydride, titanium tetrachloride and triphenyl stibine.

10. As a composition of matter, a polymerization catalyst containing lithium aluminum hydride, titanium trichloride and triphenyl stibine.

11. As a composition of matter, a polymerization catalyst containing sodium hydride, titanium trichloride and triphenyl stibine.

12. As a composition of matter, a polymerization catalyst containing calcium hydride, titanium trichloride and triethyl stibine.

13. As a composition of matter, a polymerization catalyst containing lithium aluminum hydride, titanium trichloride and tributyl stibine.

References Cited by the Examiner

UNITED STATES PATENTS

| | | | |
|---|---|---|---|
| 2,886,561 | 5/59 | Reynolds et al. | 260—94.9 |
| 2,917,500 | 12/59 | Hagemeyer | 260—94.9 |
| 3,058,969 | 10/62 | Coover et al. | 260—94.9 |
| 3,072,629 | 1/63 | Coover et al. | 260—94.9 |

JOSEPH L. SCHOFER, *Primary Examiner.*